(12) United States Patent
Muramatsu et al.

(10) Patent No.: US 11,441,712 B2
(45) Date of Patent: Sep. 13, 2022

(54) HOSE CLAMP

(71) Applicant: PIOLAX, INC., Kanagawa (JP)

(72) Inventors: Shun Muramatsu, Kanagawa (JP); Ken Sodeyama, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 212 days.

(21) Appl. No.: 16/877,880

(22) Filed: May 19, 2020

(65) Prior Publication Data

US 2020/0370693 A1 Nov. 26, 2020

(30) Foreign Application Priority Data

May 24, 2019 (JP) .............................. JP2019-097953

(51) Int. Cl.
*F16L 33/02* (2006.01)
*F16L 33/035* (2006.01)
*F16L 33/03* (2006.01)

(52) U.S. Cl.
CPC ........... *F16L 33/023* (2013.01); *F16L 33/035* (2013.01); *F16L 33/03* (2013.01); *Y10T 24/1484* (2015.01)

(58) Field of Classification Search
CPC .. F16B 2/245; Y10T 24/1457; Y10T 24/1484; B25B 27/146; B25B 25/006; F16L 33/03; F16L 33/02
See application file for complete search history.

(56) References Cited

U.S. PATENT DOCUMENTS

| 5,996,186 | A  | * | 12/1999 | Yamada ................. | F16L 33/03 24/23 EE |
| 9,517,805 | B2 | * | 12/2016 | Perry ................... | H04B 5/0062 |
| 11,091,363 | B1 | * | 8/2021 | Martin .................... | F16L 33/02 |
| 2018/0347736 | A1 | * | 12/2018 | Garcia Lopez ......... | F16L 33/03 |
| 2019/0137007 | A1 | * | 5/2019 | Nagai ................... | F16L 3/1222 |

FOREIGN PATENT DOCUMENTS

| CA | 3042799 A1 | * | 11/2019 | ........... B25B 25/005 |
| GB | 2295418 A | * | 5/1996 | ............. F16L 33/03 |
| JP | H06-080990 U | | 11/1994 | |

\* cited by examiner

*Primary Examiner* — Robert Sandy
*Assistant Examiner* — Michael S Lee
(74) *Attorney, Agent, or Firm* — Paratus Law Group, PLLC (57) ABSTRACT

A hose clamp includes a clamp main body including a ring portion and a pair of knob portions; and a holder. The holder includes a main body portion, a pair of holding walls, and an operation portion. An inner surface on a distal end side of one holding wall includes a protrusion that protrudes more largely inward than an inner surface on a distal end side of other holding wall. And in a state where the pair of knob portions are close to each other, a distal end of one knob portion in a peripheral direction is engaged with the inner surface of the one holding wall, and the other knob portion is engaged with the inner surface of the other holding wall, so that the ring portion is kept in a diameter-increased state.

7 Claims, 12 Drawing Sheets

HOSE CLAMP

CROSS-REFERENCE TO RELATED APPLICATIONS

This application is based on Japanese Patent Application No. 2019-097953 filed on May 24, 2019, the contents of which are incorporated herein by way of reference.

BACKGROUND

The present invention relates to a hose clamp used, for example, when pipes of an automobile are connected by using a hose.

In the related art, when pipes of an automobile are connected by using a hose, an outer periphery of an end portion of a pipe is covered by a flexible hose, and an outer periphery of the hose is further fastened by a hose clamp, so that the hose is fixed to the pipe. At this time, it is necessary to increase diameter of the hose clamp when the outer periphery of the hose is covered by the hose clamp. Therefore, a hose clamp to which a holder for keeping a diameter-increased state in advance is attached, may be used.

For example, Patent Literature 1 below describes a hose clip including a clip main body and a holder. The clip main body is formed of a leaf spring material, is formed by bending the leaf spring material in a circular ring shape such that both end portions intersect with each other, and is provided with a first locking portion and a second locking portion bent so as to be separated from each other toward an outer side in a peripheral direction on both end portions. The holder keeps the clip main body in a diameter-increased state. Further, a pair of locking leg pieces extend from both sides of a lower portion of the holder. From lower ends of the pair of locking leg pieces, hook claws are formed by bending so as to face each other. Then, the clip main body is increased in a diameter and the first and second locking portions are arranged between the pair of locking leg pieces of the holder, whereby the clip main body is kept in the diameter-increased state by the pair of locking leg pieces and the hook claws. When the clip main body is decreased in the diameter, the holder is twisted around an axis of the holder, whereby the pair of locking portions are detached from between the pair of locking leg pieces, and the clip main body can be decreased in the diameter.

Patent Literature 1: JP-UM-A-6-80990

As described above, in the hose clip of Patent Literature 1, the holder, which keeps the clip main body in the diameter-increased state, is twisted around the axis thereof, whereby the clip main body can be decreased in the diameter. The clip main body includes the first locking portion and the second locking portion bent so as to be separated from each other toward the outer side in the peripheral direction. However, there is also a demand for a configuration in which the clamp is decreased in the diameter by pulling the holder in an outer diameter direction of the clamp.

SUMMARY

Accordingly, an object of the present invention is to provide a hose clamp in which a clamp can be easily decreased in a diameter by pulling a holder in an outer diameter direction of the clamp.

According to one advantageous aspect of the invention, there is provided a hose clamp according to the present invention including: a clamp main body including a ring portion curved in a ring shape, and a pair of knob portions formed at both end portions of the ring portion in a peripheral direction so as to be bent in an outer diameter direction of the ring portion, the ring portion being decreased in a diameter in a state where the pair of knob portions are separated from each other and being increased in the diameter when the pair of knob portions are close to each other; and a holder attached to the clamp main body. At least one of the knob portions of the clamp main body has a shape bent outward in the peripheral direction of the ring portion so as to be separated from other knob portion. The holder includes a main body portion, a pair of holding walls that protrude from the main body portion and that face each other, the pair of holding walls clamping the pair of knob portions in a close state, and an operation portion that is consecutively connected to the main body portion and that is used for pulling the holder in the outer diameter direction of the ring portion. An inner surface on a distal end side of one holding wall includes a protrusion that protrudes more largely inward than an inner surface on a distal end side of other holding wall. And in a state where the pair of knob portions are close to each other, a distal end of one knob portion in the peripheral direction is engaged with the inner surface of the one holding wall, and the other knob portion is engaged with the inner surface of the other holding wall, so that the ring portion is kept in a diameter-increased state.

DESCRIPTION OF EMBODIMENTS

Hereinafter, a first embodiment of a hose clamp according to the present invention will be described with reference to FIGS. 1 to 9.

Figure 1:
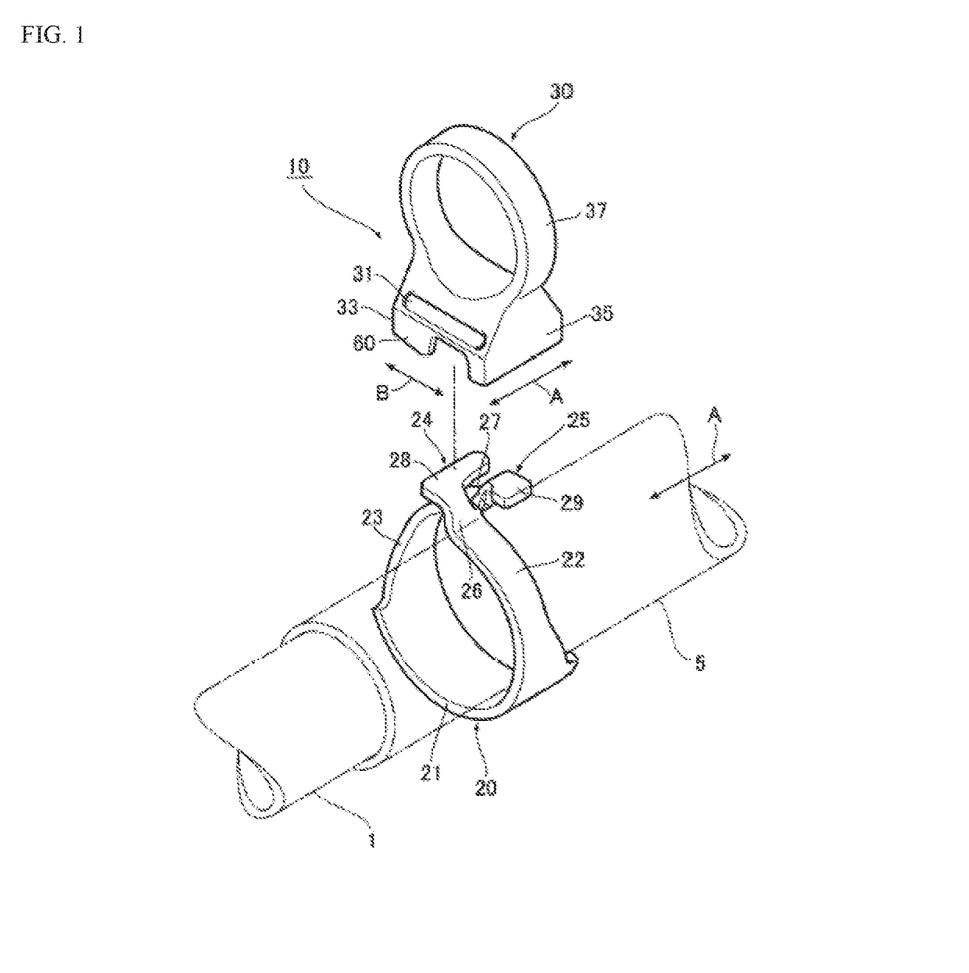
FIG. 1 shows a first embodiment of a hose clamp according to the present invention, and is a perspective view of a clamp main body and a holder in a state where the clamp main body is increased in a diameter.

For example, various pipes are provided inside an automobile or the like, and a flexible hose formed of a material such as rubber is adopted in order to connect these pipes. As shown in FIG. 1, a hose clamp 10 (hereinafter, also simply referred to as "clamp 10") of the present invention is disposed on an outer periphery of a hose 5 that covers one end portion of a pipe 1 such as a pipe or a tube, and is used for fastening the outer periphery of the hose 5 to fix the hose 5 to the pipe 1.

As shown in FIG. 1, the clamp 10 in this embodiment includes a clamp main body 20 and a holder 30 attached to the clamp main body 20.

The clamp main body 20 is formed by punching a band-shaped metal plate formed of stainless steel, spring steel, or the like into a predetermined shape and bending the metal plate. The clamp main body 20 includes a ring portion 21 curved in a ring shape and disposed to surround the outer periphery of the hose 5, and a pair of knob portions 24 and 25 formed by bending the ring portion 21 in an outer diameter direction of the ring portion 21 on both end portions 22 and 23 of the ring portion 21 in a peripheral direction. One end portion 22 extends from one end side of the ring portion 21 in a peripheral direction and from one side of an axial direction A, and the other end portion 23 extends from the other end side of the ring portion 21 in the peripheral direction and from the other side of the axial direction A. Further, the pair of knob portions include the first knob portion 24 and the second knob portion 25. The first knob portion 24 is formed on one end portion 22 side, and the second knob portion 25 is formed on the other end portion 23 side.

In the following description, an "axial direction" of the clamp main body 20, the holder 30, and the like means a direction along an axial direction of the pipe 1 and the hose 5 (described as a symbol "A").

Figure 7:
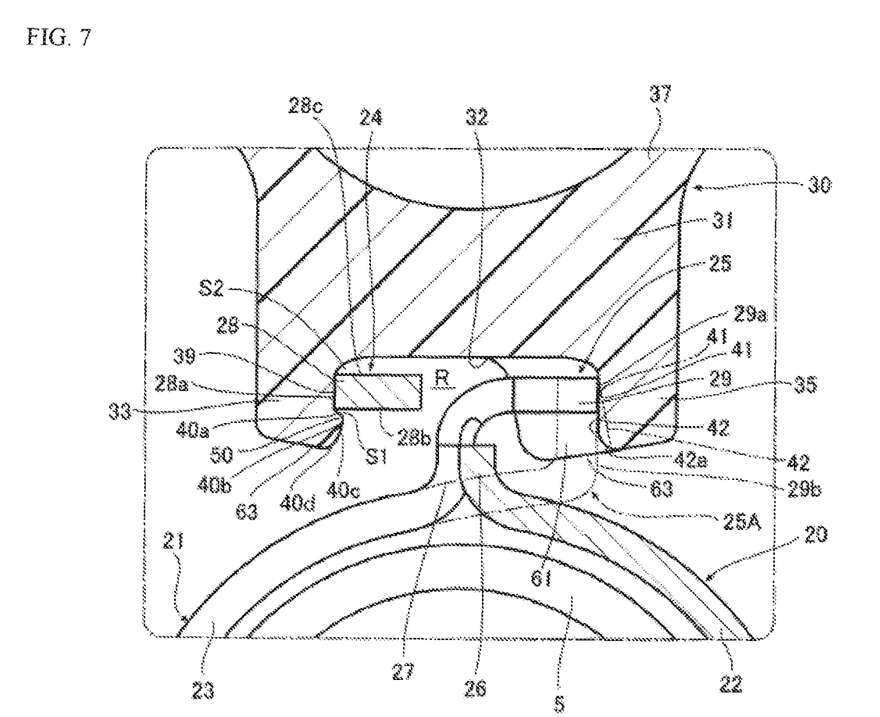
FIG. 7 is an enlarged cross-sectional view illustrating main parts of FIG. 6.

Both knob portions 24 and 25 include base ends 26 and 27 bent in the outer diameter direction of the ring portion 21, and distal ends 28 and 29 further bent, with respect to these base ends 26 and 27, outward in the peripheral direction of the ring portion 21 so as to be separated from each other. The distal end 28 of the first knob portion 24 in a peripheral direction forms a "distal end in a peripheral direction" in the present invention. The first knob portion 24 forms one knob portion. Further, the distal end 28 of the first knob portion 24 in the peripheral direction is formed to be wider in the axial direction A (longer in the axial direction A) than the distal end 29 of the second knob portion 25 in a peripheral direction. The second knob portion 25 forms the other knob portion. Further, as shown in FIG. 7, a surface of the distal end 28 of the first knob portion 24 that protrudes toward a side opposite to the second knob portion 25 is referred to as a "protruding end surface 28a". A surface of the distal end 28 close to the ring portion 21 is referred to as an "inner surface 28b". A surface of the distal end 28 separated from the ring portion 21 is referred to as an "outer surface 28c". Further, as shown in FIG. 7, a surface of the distal end 29 of the second knob portion 25 that protrudes toward a side opposite to the first knob portion 24 is referred to as a "protruding end surface 29a".

Figure 5:
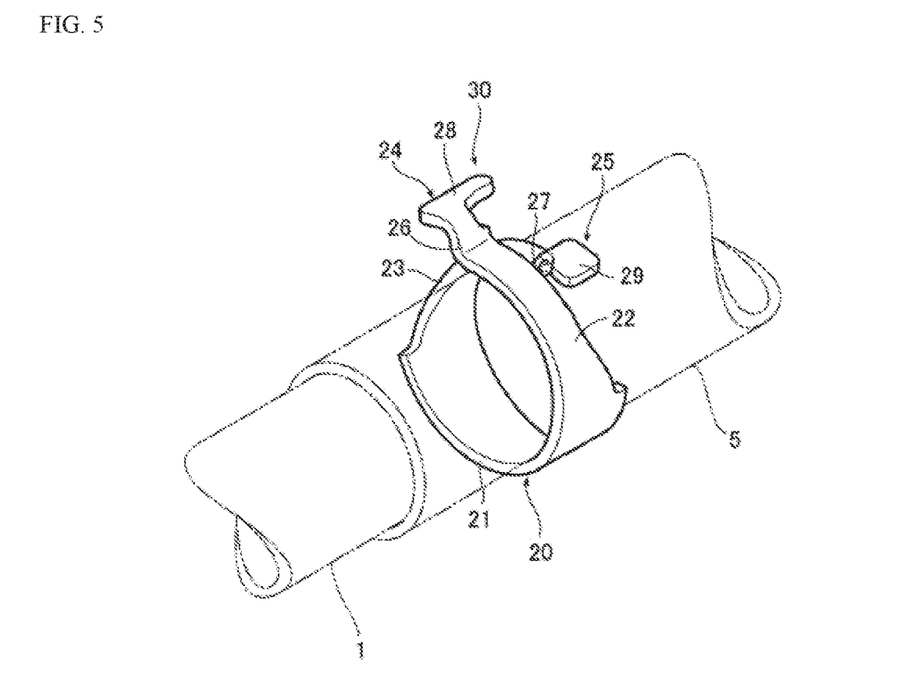
FIG. 5 is a perspective view of a state where the holder is removed from the clamp main body from the state in FIG. 4.

As shown in FIG. 5, the clamp main body 20 is in a free state where a diameter is decreased in a state where the pair of knob portions 24 and 25 are separated from each other. As shown in FIG. 1, when the pair of knob portions 24 and 25 are close to each other, the diameter is increased against an elastic force thereof.

A shape of the clamp main body is not limited to the above aspect as long as the following configuration is used. That is, the ring portion is provided and the pair of knob portions are provided on both end portions of the ring portion in the peripheral direction. The diameter is decreased in a state where the pair of knob portions are separated from each other, and the diameter is increased in a state where the pair of knob portions are close to each other. Further, in this embodiment, both the distal end 28 of one knob portion 24 and the distal end 29 of the other knob portion 25 have a shape bent outward in a peripheral direction. However, it is sufficient that at least one of the knob portions has a shape bent outward in the peripheral direction of the ring portion so as to be separated from the other knob portion. That is, as indicated by a two-dot chain line in FIG. 7, the other knob portion 25A may not have a shape bent outward in the peripheral direction of the ring portion 21, but may have a shape that extends in an outer diameter direction of the ring portion 21. In this case, a surface of the distal end 29 of the knob portion 25A that faces inner surfaces 41 and 42 of the other holding wall 35, which will be described below, of the holder 30 is referred to as a "facing surface 29b".

Figure 2:
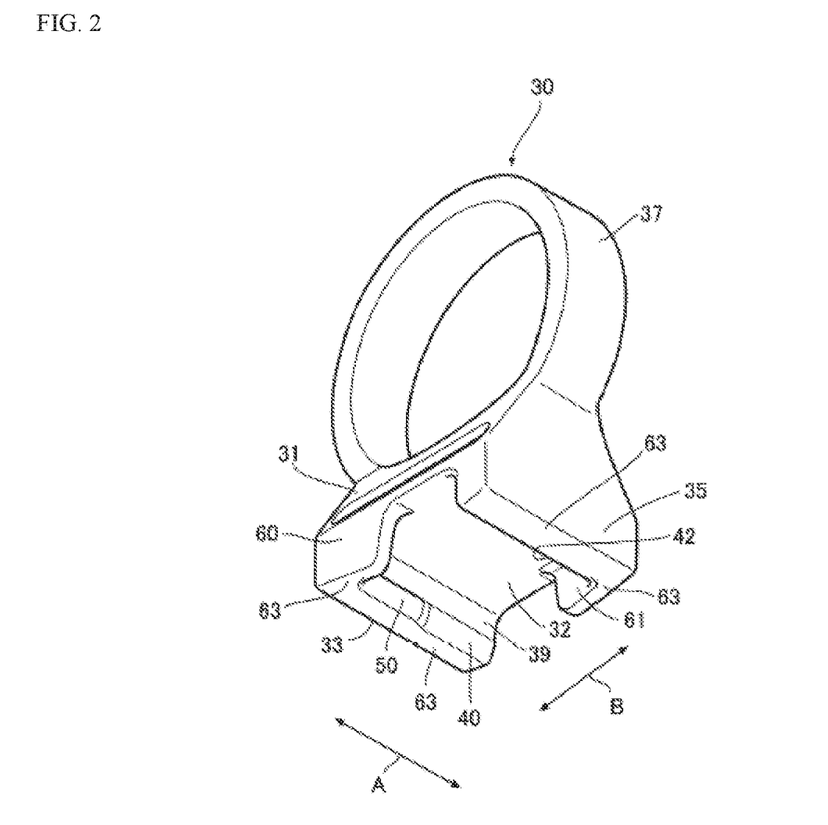
FIG. 2 is a perspective view of the holder that constitutes the same hose clamp when viewed from a direction different from direction of FIG. 1.
Figure 3:
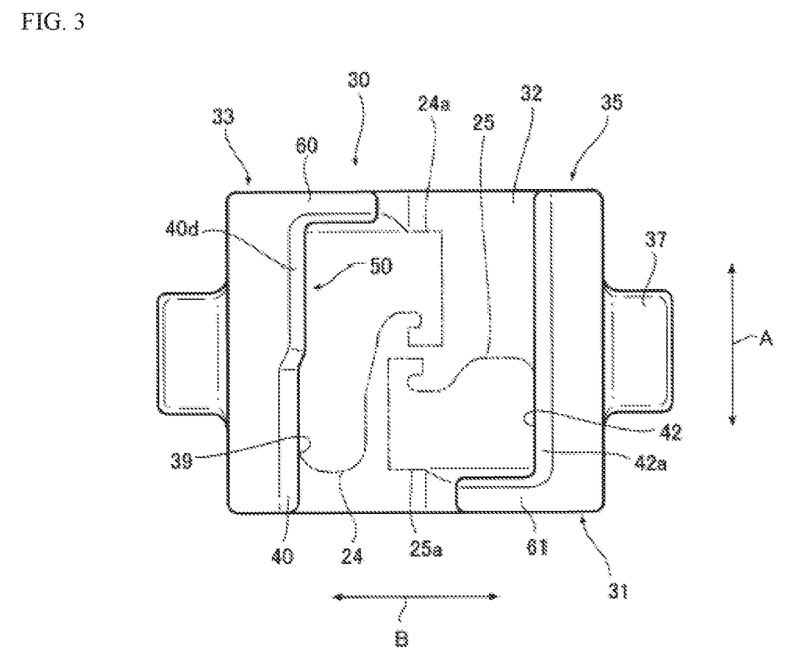
FIG. 3 is a bottom view of the holder that constitutes the same hose clamp.
Figure 4:
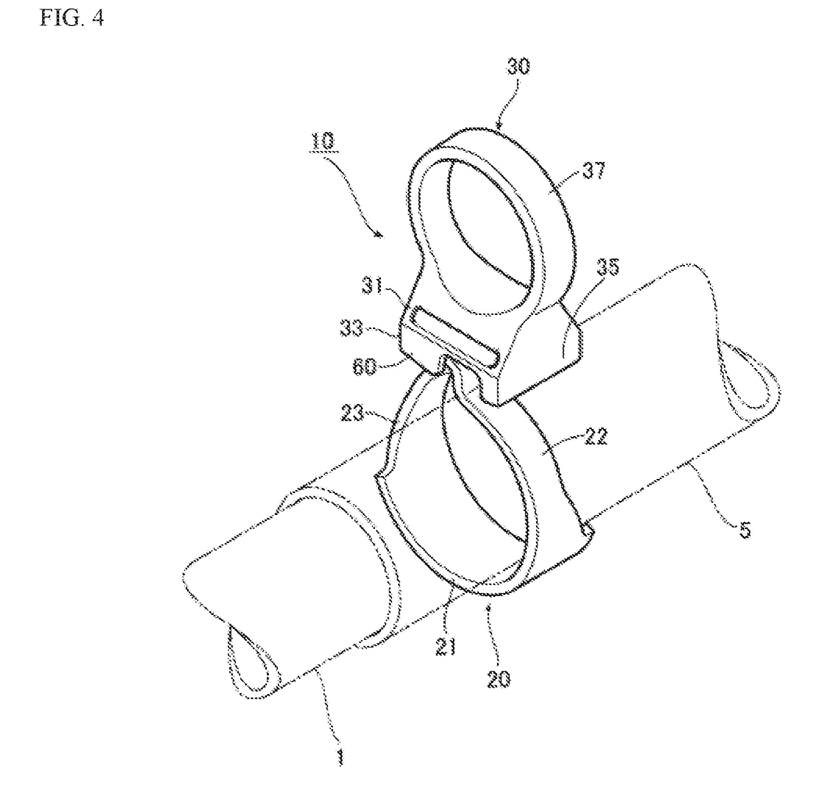
FIG. 4 is a perspective view of a state where the holder is attached to the clamp main body in the same hose clamp.

Next, the holder 30 will be described. As shown in FIGS. 1 to 3, the holder 30 in this embodiment includes a main body portion 31, a pair of holding walls 33 and 35 that protrude from an inner surface 32 side of the main body portion 31 to face each other and that clamp the pair of knob portions 24 and 25 in a close state, and an operation portion 37 that is consecutively connected to the main body portion 31 and that is used for pulling the holder 30 in the outer diameter direction of the ring portion 21.

Figure 6:
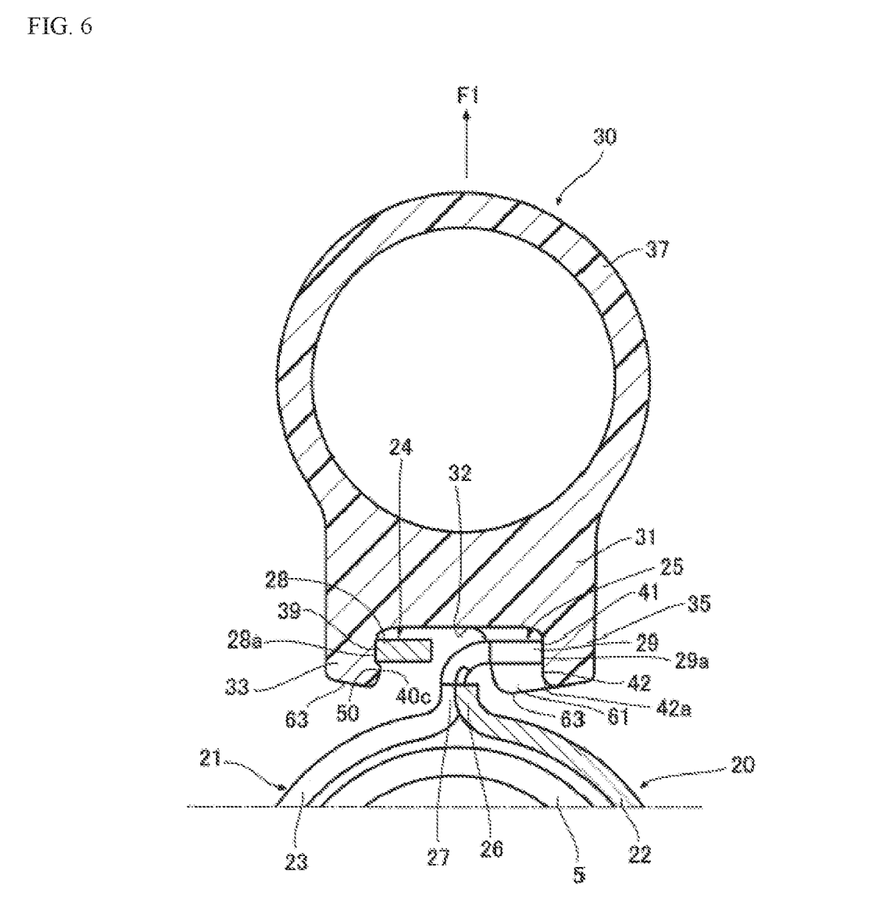
FIG. 6 is a cross-sectional view illustrating a state where holder is attached to the clamp main body in the same hose clamp.

As shown in FIGS. 1 and 6, the operation portion 37 in this embodiment has a circular ring shape that has an opening in a direction along the axial direction A of the main body portion 31, and extends toward a side opposite to a protruding direction of the pair of holding walls 33 and 35 of the main body portion 31 so as to be orthogonal to the inner surface 32 (see FIG. 6) of the main body portion 31. The operation portion is not limited to the circular ring shape, and may have a columnar shape, a T-shape, or the like, as long as an operator can grip directly or via a gripping tool such as pliers. Further, an installation direction of the operation portion with respect to the main body portion is also not limited to the above aspect.

As shown in FIG. 2, the pair of holding walls 33 and 35 respectively protrude by a predetermined protruding amount from both sides of the inner surface 32 (surface that faces the ring portion 21 of the clamp main body 20) of the main body portion 31 in a width direction B of the inner surface 32.

As shown in FIG. 2, distal ends of the pair of holding walls 33 and 35 in a protruding direction from the inner surface 32 are separated from each other. Further, both sides of the pair of holding walls 33 and 35 in the width direction B are also separated from each other, and have a shape in which distal end sides in the protruding direction and both sides in the width direction are opened.

In the following description, the "width direction" means a direction orthogonal to the axial direction A of the hose 5 and along a tangent to the outer periphery of the hose 5 (described as a symbol "B").

A surface of one holding wall 33 that faces the other holding wall 35 side (surface close to the other holding wall 35) is referred as an inner surface of the holding wall 33, and a surface of the other holding wall 35 that faces one holding wall 33 side (surface close to one holding wall 33) is referred as an inner surface of the holding wall 35. Further, surfaces on sides opposite to the inner surfaces of the holding walls 33 and 35 are referred as outer surfaces of the holding walls 33 and 35.

As shown in FIG. 3, the pair of holding walls 33 and 35 extend along the axial direction A of the main body portion 31, and are provided over an entire length of the main body portion 31 in the axial direction A.

As shown in FIG. 3, pressing walls 60 and 61 are respectively arranged at positions in the holder 30 that face outer side surfaces 24a and 25a of the pair of knob portions 24 and 25 in the axial direction A.

Specifically, as shown in FIGS. 2 and 3, the pressing wall 60 extends from one side of one holding wall 33 in the width direction B toward the other holding wall 35, and the pressing wall 61 extends from the other side of the other holding wall 35 in the width direction B toward one holding wall 33. As shown in FIG. 3, the pair of pressing walls 60 and 61 are arranged orthogonally to the holding walls 33 and 35 (extend along the width direction B). Then, as shown in FIG. 3, the pressing wall 60 provided on one holding wall 33 side faces the outer side surface 24a of the knob portion 24 in the axial direction A, and the pressing wall 61 provided on the other holding wall 35 side faces the outer side surface 25a of the knob portion 25 in the axial direction A.

Figure 8:
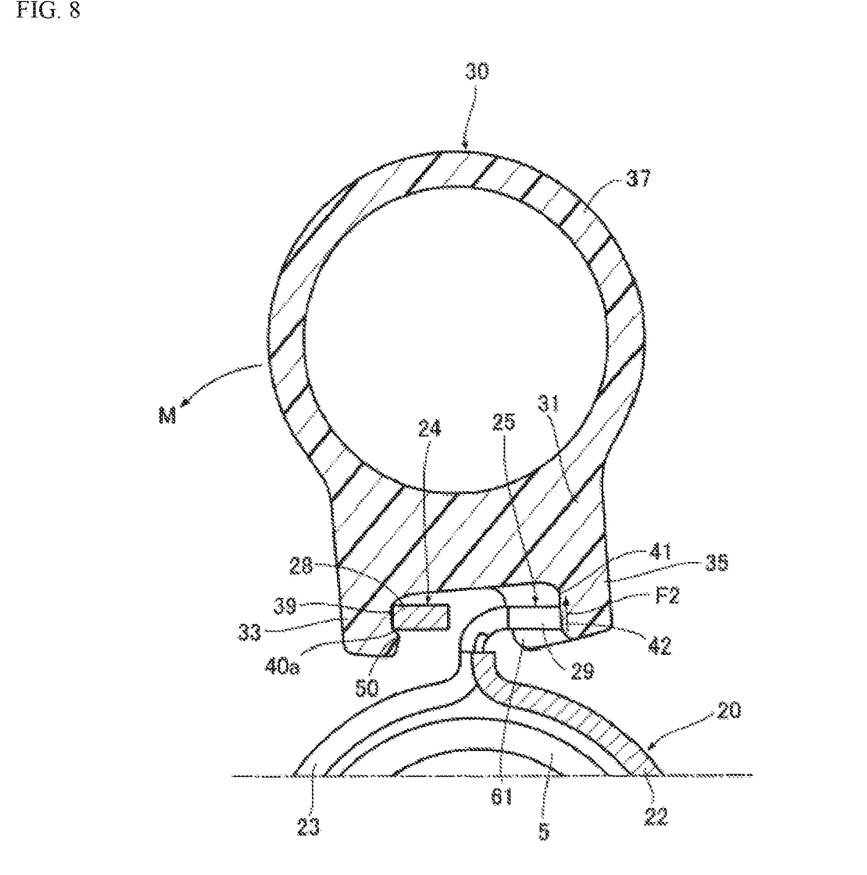
FIG. 8 is a cross-sectional view illustrating a state where the holder is pulled in an outer diameter direction via an operation portion from the state in FIG. 6 in the same hose clamp.
Figure 9:
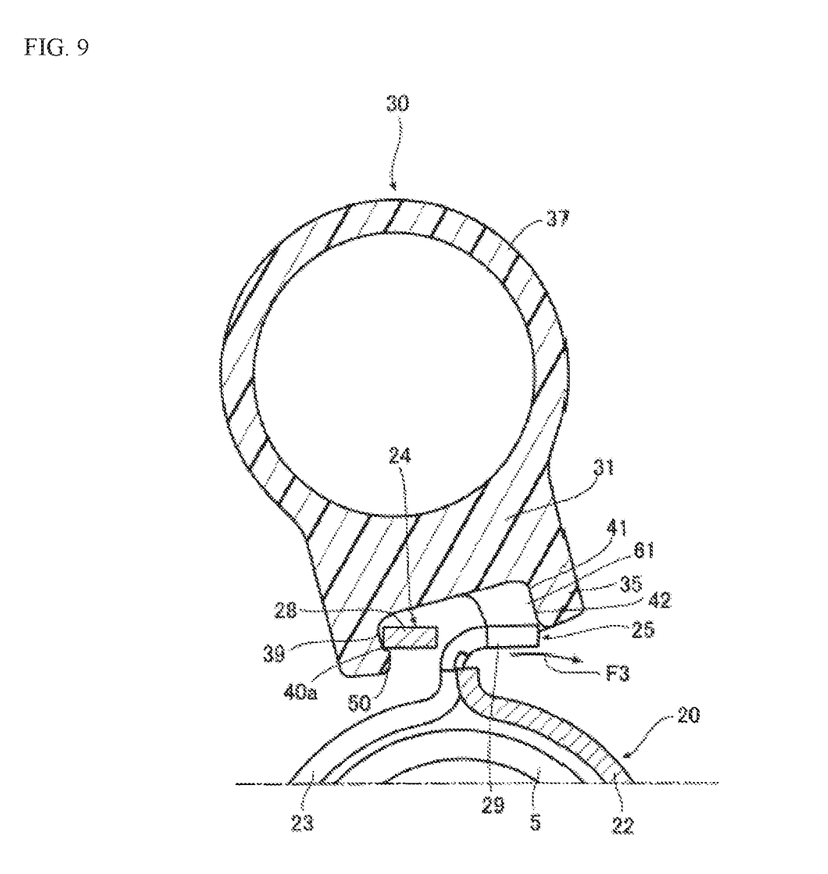
FIG. 9 is a cross-sectional view illustrating a state where the holder is further pulled in the outer diameter direction from the state in FIG. 8 in the same hose clamp.

As shown in FIG. 6, facing surfaces 63 and 63 of the pair of holding walls 33 and 35 and of the pressing walls 60 and 61, have a tapered shape inclined from inner surface sides toward outer surface sides of the holding walls 33 and 35 such that a protruding amount from the inner surface 32 of the main body portion 31 is gradually decreased. The facing surfaces 63 and 63 face the ring portion 21 of the clamp main body 20. As a result, as shown in FIGS. 6 and 7, in a state where the holder 30 is attached to the clamp main body 20, it is easy to ensure clearances between (i) the facing surfaces 63 and 63 of the holding walls 33 and 35 and (ii) one end portion 22 and the other end portion 23 of the clamp main body 20. As shown in FIGS. 8 and 9, when the operation portion 37 is pulled to rotate the holder 30, the holder 30 is easily rotated.

In the holder 30, as shown in FIGS. 2 and 7, the inner surface 40 of one holding wall 33 on a distal end side (hereinafter, also simply referred to as "distal end side inner surface 40") includes a protrusion 50 that protrudes more largely inward than the inner surface 42 of the other holding wall 35 on a distal end side (hereinafter, also simply referred to as "distal end side inner surface 42").

That is, in the holder 30, the inner surfaces of the pair of holding walls 33 and 35 are respectively formed such that an inward protruding amount, of the distal end side inner surface 40 of one holding wall 33, from an inner surface 39 on a base end side (hereinafter, also simply referred to as "base end side inner surface 39") is larger than an inward protruding amount, of the distal end side inner surface 42 of the other holding wall 35, from an inner surface 41 on a base end side (hereinafter, also simply referred to as "base end side inner surface 41"). Thereby, the protrusion 50 as described above is provided on the distal end side inner surface 40 of one holding wall 33.

The above "inward" means a direction from the inner surfaces of the holding walls 33 and 35 toward a space R (see FIG. 7) formed between the pair of holding walls 33 and 35, or a direction in which one holding wall 33 approaches the other holding wall 35 and a direction in which the other holding wall 35 approaches one holding wall 33. Further, "distal end side inner surfaces" of the holding walls in the present invention mean distal end side (one end side away from the inner surface 32) inner surfaces, of the holding walls 33 and 35, in a protruding direction from the inner surface 32 of the main body portion 31. Further, "base end side inner surfaces" of the holding walls mean base end side (the other end side close to the inner surface 32) inner surfaces, of the holding walls 33 and 35, in a protruding direction from the inner surface 32 of the main body portion 31.

The above "protruding amount" means a position from a position where an inward protruding amount of the base end side inner surfaces of the holding walls is the smallest (lowest) to a position where an inward protruding amount of the distal end side inner surfaces of the holding walls is the largest (highest).

Inner surface shapes of the holding walls 33 and 35 will be described in more detail. In a case of this embodiment, as shown in FIG. 7, the inner surface of the other holding wall 35 has a planar shape orthogonal to the inner surface 32 of the main body portion 31 from the base end side inner surface 41 to the distal end side inner surface 42. In other words, the inner surface of the other holding wall 35 (base end side inner surface 41 and distal end side inner surface 42) has a planar shape orthogonal to a direction in which the pair of holding walls 33 and 35 face each other. That is, in this embodiment, inward protruding amount of the distal end side inner surface 42 of the holding wall 35 from the base end side inner surface 41 is zero. Further, a R-shaped surface 42a having an arc shape is formed on a most distal end of the distal end side inner surface 42. As indicated by a two-dot chain line in FIG. 7, the inner surface of the other holding wall 35 may have a shape formed to be inclined such that the distal end side of the other holding wall 35 is away from one holding wall 33.

In this embodiment, as shown in FIG. 7, in a state where the pair of knob portions 24 and 25 are close to each other, the distal end 28 of the first knob portion 24 in the peripheral direction is engaged with the inner surface of one holding wall 33, and the distal end 29 of the second knob portion 25 in the peripheral direction is engaged with the inner surface of the other holding wall 35. In this state, the inner surface of the other holding wall 35 is formed to be parallel to the distal end 29 of the second knob portion 25. Here, as shown in FIG. 7, the protruding end surface 29a of the distal end 29 of the second knob portion 25 is parallel to the base end side inner surface 41 and the distal end side inner surface 42 of the other holding wall 35. The inner surface of the other holding wall 35 may be formed to be inclined such that the distal end side of the holding wall 35 is moved away in a state where the pair of knob portions 24 and 25 are close to each other as shown in FIG. 7 (see the two-dot chain line in FIG. 7). Further, as indicated by a two-dot chain line in FIG. 7, when the other knob portion 25A has a shape that extends in the outer diameter direction of the ring portion 21, the facing surface 29b of the distal end 29 of the other knob portion 25A is parallel to the base end side inner surface 41 and the distal end side inner surface 42 of the other holding wall 35.

Further, in this embodiment, as described above, although the inward protruding amount of the distal end side inner surface 42 of the other holding wall 35 with respect to the base end side inner surface 41 is zero, the distal end side inner surface 42 may protrude more inward than the base end side inner surface 41. However, an inward protruding amount of the distal end side inner surface 42 from the base end side inner surface 41 is needed to be smaller than an inward protruding amount of the distal end side inner surface 40 of one holding wall 33 from the base end side inner surface 39.

Next, an inner surface shape of the holding wall 33 will be described. As shown in FIG. 7, in this embodiment, the base end side inner surface 39 of the holding wall 33 is orthogonal to the inner surface 32 of the main body portion 31. Further, as shown in FIGS. 2 and 3, the distal end side inner surface 40 of the holding wall 33 has a tapered surface shape in which an interval between the distal ends of the pair of holding walls 33 and 35 in a protruding direction is gradually increased in a range of half of the holding wall 33 in the axial direction A.

As shown in FIGS. 2 and 3, on the distal end side inner surface 40 of the holding wall 33, the protrusion 50 that protrudes inward by a predetermined height with respect to the base end side inner surface 39 and that protrudes largely inward toward the other holding wall 35, is provided in a range of remaining half of the holding wall 33 in the axial direction A. One end of the protrusion 50 in the axial direction A is connected to the pressing wall 60.

An inner surface of the protrusion 50 is also a part of the distal end side inner surface 40 of the holding wall 33. That is, as shown in FIG. 7, at a position adjacent to the base end side inner surface 39 on the inner surface of the protrusion 50, an engagement surface 40a is formed. The engagement surface 40a gradually protrudes higher toward a distal end side of the other holding wall 35 in a protruding direction. A tapered surface 40c, which is inclined to be gradually lowered toward a distal end side of the other holding wall 35 in the protruding direction, is formed at a position adjacent to the engagement surface 40a via a top portion 40b of the engagement surface 40a (portion having the largest protruding amount from the base end side inner surface 39). Further, a R-shaped surface 40d having an arc shape is formed on a distal end side of the tapered surface 40c (portion having the smallest protruding amount).

As described above, the protrusion 50 is provided on the inner surface of one holding wall 33, whereby the engagement surface 40a, the top portion 40b, and also the tapered surface 40c of the protrusion 50 protrude largely inward from the base end side inner surface 39 (see FIG. 7). The inward protruding amount of the distal end side inner surface 40 of the holding wall 33 from the base end side inner surface 39 (here, a distance from the base end side inner surface 39 to the top portion 40b of the protrusion 50) is larger than the inward protruding amount of the distal end side inner surface 42 of the holding wall 35 from the base end side inner surface 41.

The protrusion 50 may be formed over an entire length of the holding wall 33 in the axial direction A, and a shape thereof is not particularly limited.

In the holder 30, as shown in FIGS. 6 and 7, in a state where the pair of knob portions 24 and 25 are close to each other, the distal end 28 of the first knob portion 24 in the peripheral direction is engaged with the inner surface of one holding wall 33, and the distal end 29 of the second knob portion 25 is engaged with the inner surface of the other holding wall 35, so that the ring portion 21 is kept in a diameter-increased state.

In this embodiment, as shown in FIGS. 6 and 7, the distal end 28 of the first knob portion 24 in the peripheral direction is engaged with the base end side inner surface 39 of one holding wall 33 (here, the protruding end surface 28a of the distal end 28 is engaged), and the distal end 29 of the second knob portion 25 in the peripheral direction is engaged with the base end side inner surface 41 of the other holding wall 35 (here, the protruding end surface 29a of the distal end 29 is engaged). Further, as shown in FIG. 7, in a state where the protruding end surface 28a of the distal end 28 of the first knob portion 24 is engaged with the inner surface of one holding wall 33 and the ring portion 21 is kept in the diameter-increased state, the first knob portion 24 has gaps S1 and S2 with respect to the protrusion 50 and the inner surface of the main body portion 31. Here, the gap S1 is formed between the engagement surface 40a of the protrusion 50 and the inner surface 28b of the distal end 28 of the first knob portion 24, and the gap S2 is formed between the inner surface 32 of the main body portion 31 and the outer surface 28c of the distal end 28 of the first knob portion 24 in this embodiment, although the first knob portion 24 has the gaps S1 and S2 with both the protrusion 50 and the inner surface 32 of the main body portion 31, a gap may be provided either between the first knob portion 24 and the protrusion 50, or between the first knob portion 24 and the inner surface 32 of the main body portion 31.

When the holder 30 is pulled toward the outer diameter direction of the ring portion 21 via the operation portion 37 from a state in FIG. 6 (see an arrow F1 in FIG. 6), the distal end 28 of the first knob portion 24 is hooked on the protrusion 50 of the distal end side inner surface 40 of one holding wall 33, and the holder 30 is rotated as shown in FIGS. 8 and 9.

More specifically, as shown in FIG. 6, in a state where the pair of knob portions 24 and 25 are close to each other to keep the diameter of the ring portion 21 increased, when the operation portion 37 is gripped and the holder 30 is pulled toward the outer diameter direction of the ring portion 21 (see the arrow F1 in FIG. 6), the distal end 28 of the first knob portion 24 is hooked on the protrusion 50 of the distal end side inner surface 40 of one holding wall 33. Since a rotational moment M is applied to the holder 30, a pullout force F2 (see FIG. 8) is applied to an engagement portion between the other holding wall 35 and the second knob portion 25, the second knob portion 25 is pulled out from the inner surface of the other holding wall 35, the engagement is released, and the ring portion 21 can be decreased in the diameter.

Next, a procedure when the flexible hose 5 formed of a material such as rubber is fastened and fixed to the pipe 1 by using the clamp 10 having the above configuration, will be described.

That is, from a state where the pair of knob portions 24 and 25 are separated from each other and the ring portion 21 is decreased in the diameter (see FIG. 5), the pair of knob portions 24 and 25 are pinched by a tool such as pliers or pincers, and the ring portion 21 is increased in the diameter by making the pair of knob portions 24 and 25 close to each other against an elastic force of the ring portion 21. While maintaining this state, the pair of closely arranged knob portions 24 and 25 are inserted between the pair of holding walls 33 and 35 of the holder 30. At this time, the first knob portion 24 is inserted into a holding wall 33 side, and the second knob portion 25 is inserted into a holding wall 35 side. Then, as shown in FIGS. 6 and 7, the protruding end surface 28a of the distal end 28 of the first knob portion 24 in the peripheral direction is engaged with the base end side inner surface 39 of one holding wall 33, and the protruding end surface 29a of the distal end 29 of the second knob portion 25 in the peripheral direction is engaged with the base end side inner surface 41 of the other holding wall 35, so that the ring portion 21 is kept in the diameter-increased state. Further, in this state, as shown in FIG. 7, the gap S1 is formed between the engagement surface 40a of the protrusion 50 and the inner surface 28b of the distal end 28 of the first knob portion 24, and the gap S2 is formed between the inner surface 32 of the main body portion 31 and the outer surface 28c of the distal end 28 of the first knob portion 24.

Next, the clamp 10 in the diameter-increased state is disposed on the outer periphery of the hose 5 attached to an outer periphery of one end portion of the pipe 1. Thereafter, the operation portion 37 is gripped, and the holder 30 is pulled toward the outer diameter direction of the ring portion 21 as indicated by the arrow F1 in FIG. 6. Then, the inner surface of the ring portion 21 abuts against the outer periphery of the hose 5, and the distal end 28 of the first knob portion 24 is hooked on the engagement surface 40a of the protrusion 50 of the distal end side inner surface 40 of one holding wall 33. Therefore, this portion serves as a rotation support of the holder 30, and the rotational moment M is applied to the holder 30 as shown in FIG. 8. As a result, the pullout force F2 (see FIG. 8) is applied to the engagement portion between the other holding wall 35 and the second knob portion 25. Therefore, the second knob portion 25 is pulled out from the inner surface of the other holding wall 35, and the engagement is released, as shown in FIG. 9. Then, due to the elastic force of the ring portion 21, as indicated by an arrow F3 in FIG. 9, the ring portion 21 can be decreased in the diameter by moving the second knob portion 25 in a direction separated from the first knob portion 24.

In this way, in the clamp 10, the rotational moment M is applied by hooking one knob portion 24 on the protrusion 50 of one holding wall 33, and thus the other knob portion 25 is easily pulled out from the other holding wall 35. Therefore, diameter-decreasing work of the clamp 10 can be easily performed. As a result, as shown in FIG. 5, the hose 5 is fastened by the clamp 10, so that the hose 5 and the pipe 1 can be firmly connected to each other. Further, the holder 30 is pulled in the outer diameter direction of the ring portion 21, so that the clamp 10 that can decrease the diameter of the ring portion 21 can be provided.

In this embodiment, as shown in FIG. 7, in a state where the ring portion 21 is kept in the diameter-increased state, the first knob portion 24 has the gaps S1 and S2 with the protrusion 50 and the inner surface 32 of the main body portion 31 (here, the gap S1 is formed between the engagement surface 40a of the protrusion 50 and the inner surface 28b of the distal end 28 of the first knob portion 24, and the gap S2 is formed between the inner surface 32 of the main body portion 31 and the outer surface 28c of the distal end 28 of the first knob portion 24). Therefore, even when the operation portion 37 is pulled in the outer diameter direction of the ring portion 21 and the first knob portion 24 is hooked on the protrusion 50 of one holding wall 33, by the gaps S1 and S2, the holder 30 can be easily inclined and rotated, and the diameter-decreasing work of the ring portion 21 can be more easily performed. When there is no gap between the first knob portion 24 and the protrusion 50 or the inner surface 32 of the main body portion 31, there is little room for rotating the holder 30, and the holder 30 is difficult to be rotated. Even when the first knob portion 24 has a gap only with one of the protrusion 50 and the inner surface 32 of the main body portion 31, the same effect is obtained.

In this embodiment, as shown in FIG. 7, the inner surface of the other holding wall 35 (the base end side inner surface 41 and the distal end side inner surface 42) has a planar shape orthogonal to the direction in which the pair of holding walls 33 and 35 face each other. Therefore, in a state where the pair of knob portions 24 and 25 are close to each other, the distal end 28 of the first knob portion 24 is engaged with the inner surface of one holding wall 33, and the distal end 29 of the second knob portion 25 is engaged with the inner surface of the other holding wall 35, the inner surface of the other holding wall 35 is parallel to the distal end 29 of the second knob portion 25 (here, the protruding end surface 29a of the distal end 29 of the second knob portion 25 is parallel to the base end side inner surface 41 and the distal end side inner surface 42 of the holding wall 35). According to this aspect, when the operation portion 37 is pulled in the outer diameter direction of the ring portion 21 from the diameter-increased state of the ring portion 21, the second knob portion 25 can be more easily pulled out from the inner surface of the other holding wall 35, and the holder 30 can be more easily rotated. This effect is exerted in the same way as described above, even when the inner surface of the other holding wall 35 is formed to be inclined such that the distal end side of the other holding wall 35 is away from one holding wall 33, as indicated by the two-dot chain line in FIG. 7. Further, the same effect is obtained even when the other knob portion 25A has a shape that extends in the outer diameter direction of the ring portion 21, and the facing surface 29b of the distal end 29 of the other knob portion 25A is engaged with the inner surface of the other holding wall 35, as indicated by the two-dot chain line in FIG. 7.

In this embodiment, as shown in FIG. 3, the pressing wall 60 provided on one holding wall 33 side faces the outer side surface 24a of the knob portion 24 in the axial direction A, and the pressing wall 61 provided on the other holding wall 35 side faces the outer side surface 25a of the knob portion 25 in the axial direction A. That is, the pressing walls 60 and 61 are respectively arranged at the positions in the holder 30 that face the outer side surfaces of the pair of knob portions 24 and 25 in the axial direction A. Therefore, as in the present embodiment, even when the clamp main body 20 having a shape without a slit is used, both end portions 22 and 23 of the ring portion 21 in the peripheral direction can be restrained from moving outward in the axial direction A, and the holder 30 can be firmly attached to the clamp main body 20.

In this embodiment, as shown in FIG. 1, the distal end 28 of the first knob portion 24 in the peripheral direction, the first knob portion 24 being one knob portion, is formed to be wider in the axial direction A of the ring portion 21 than the second knob portion 25 that is the other knob portion. As shown in FIG. 7, in a state where the pair of knob portions 24 and 25 are close to each other, the distal end 28 of the first knob portion 24 is engaged with the distal end side inner surface 40 of one holding wall 33, and the second knob portion 25 (here, the distal end 29 in the peripheral direction) is engaged with the inner surface of the other holding wall 35, so that the ring portion 21 is kept in the diameter-increased state.

According to this aspect, the wide distal end 28 of the first knob portion 24 is firmly engaged with the protrusion 50 of one holding wall 33 with a large engagement area, while the largely engaged portion serving as the rotation support, the second knob portion 25 narrower than the first knob portion 24 is pulled out from the inner surface of the other holding wall 35. Therefore, when the operation portion 37 is pulled in the outer diameter direction of the ring portion 21 from the diameter-increased state of the ring portion 21, the holder 30 can be more easily rotated, and the second knob portion 25 that is the other knob portion can be easily pulled out from the other holding wall 35.

Figure 10:
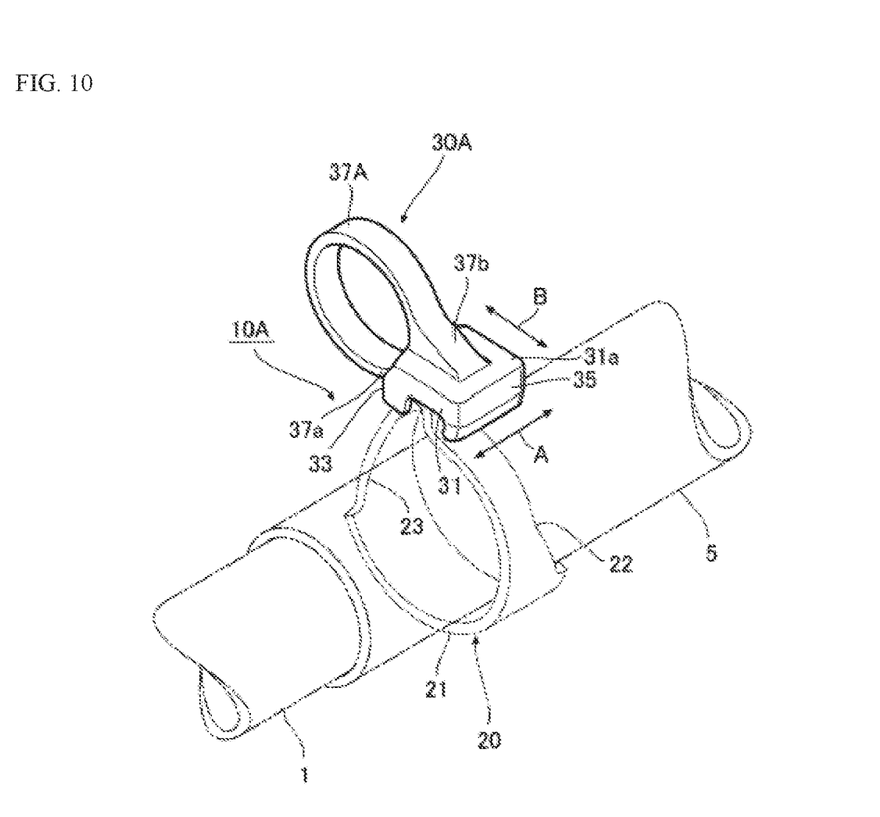
FIG. 10 shows a second embodiment of the hose clamp according to the present invention, and is a perspective view of a holder.

FIG. 10 shows a second embodiment of the hose clamp according to the present invention. Parts that are substantially the same as those of the above embodiment are given the same reference numerals, and descriptions thereof are omitted.

A hose clamp 10A (hereinafter, referred to as "clamp 10A") in this embodiment is different from the above embodiment in the structure of the operation portion of the holder.

Different from the above embodiment, an operation portion 37A of a holder 30A in this embodiment is consecutively connected to a lateral side of the main body portion 31. Further, the operation portion 37A has (i) one end 37a connected to an outer surface of the holding wall 33 of the main body portion 31 and (ii) the other end 37b connected to a ceiling surface 31a (surface on a side opposite to the inner surface 32) of the main body portion 31, and has a ring shape that has an opening in a direction along the axial direction A of the main body portion 31.

Also in the clamp 10A, in a state where the pair of knob portions 24 and 25 are close to each other to keep a diameter of the ring portion 21 increased, when the operation portion 37A is gripped and the holder 30A is pulled in an outer diameter direction of the ring portion 21, the distal end 28 of the first knob portion 24 is hooked on the protrusion 50 of the distal end side inner surface 40 of the holding wall 33, and the rotational moment M is applied to the holder 30A. Therefore, the other knob portion 25 can be easily pulled out from the other holding wall 35, and diameter-decreasing work of the clamp 10A can be easily performed.

Figure 11:
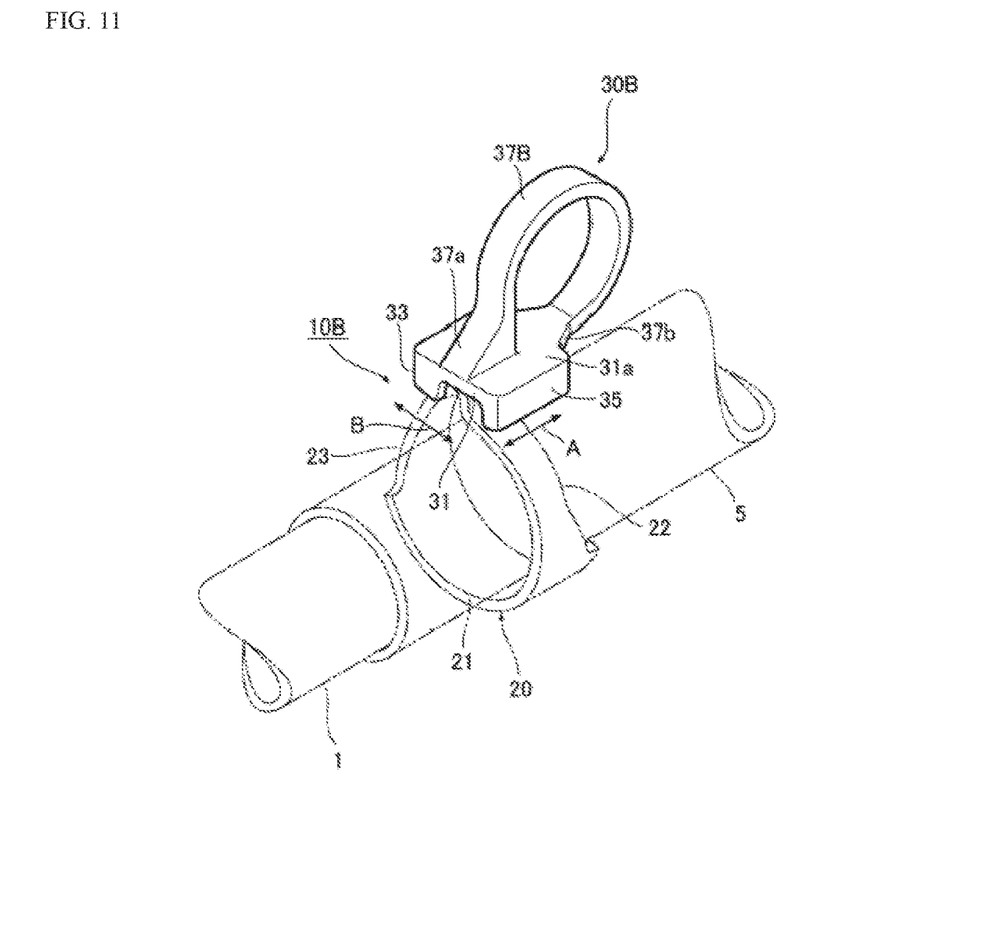
FIG. 11 shows a third embodiment of the hose clamp according to the present invention, and is a perspective view of a holder.
Figure 12:
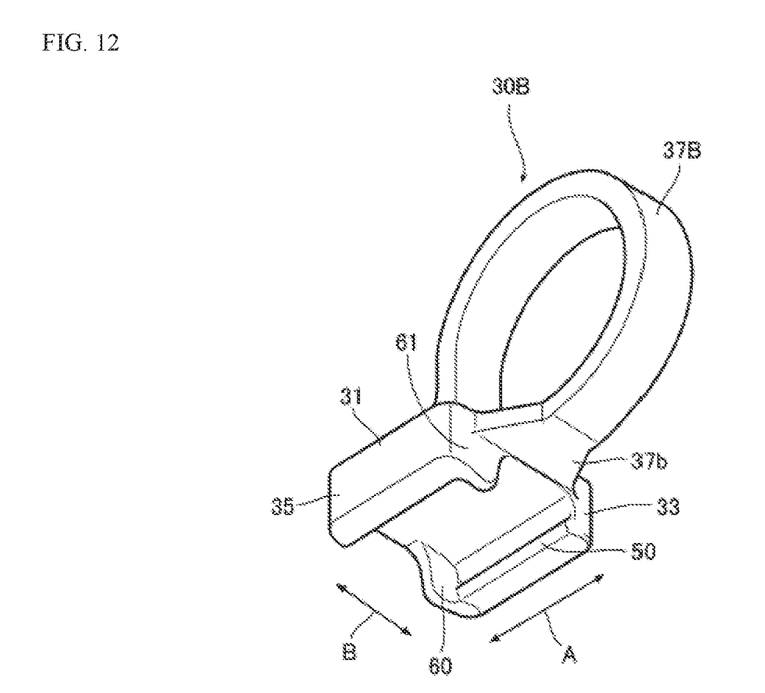
FIG. 12 is a perspective view of the holder that constitutes the same hose clamp when viewed from a direction different from direction of FIG. 11.

FIGS. 11 and 12 show a third embodiment of the hose clamp according to the present invention. Parts that are substantially the same as those of the above embodiment are given the same reference numerals, and descriptions thereof are omitted.

A hose clamp 10B (hereinafter, referred to as "clamp 10B") in this embodiment is different from the above embodiment in the structure of the operation portion of the holder.

An operation portion 37B of a holder 30B in this embodiment also has a structure of being consecutively connected to a lateral side of the main body portion 31. Further, the operation portion 37B has (i) one end 37a connected to one side of the ceiling surface 31a of the main body portion 31 in the axial direction A and (ii) the other end 37b connected to a peripheral edge portion on the other side of the main body portion 31 in the axial direction A, and has a ring shape that has an opening in a direction along the width direction B of the main body portion 31.

Also in the clamp 10B, in a state where the pair of knob portions 24 and 25 are close to each other to keep a diameter of the ring portion 21 increased, when the operation portion 37B is gripped and the holder 30B is pulled in an outer diameter direction of the ring portion 21, the distal end 28 of the first knob portion 24 is hooked on the protrusion 50 of the distal end side inner surface 40 of the holding wall 33, and the rotational moment M is applied to the holder 30B. Therefore, the other knob portion 25 can be easily pulled out from the other holding wall 35, and diameter-decreasing work of the clamp 10B can be easily performed.

The present invention is not limited to the embodiments described above and various modified embodiments are possible within the scope of the present invention; such embodiments are also included in the scope of the present invention.

What is claimed is:

1. A hose clamp comprising:
a clamp main body including
  a ring portion curved in a ring shape, and
  a pair of knob portions formed at both end portions of the ring portion in a peripheral direction so as to be bent in an outer diameter direction of the ring portion, the ring portion being decreased in a diameter in a state where the pair of knob portions are separated from each other and being increased in the diameter when the pair of knob portions are close to each other; and
a holder attached to the clamp main body, wherein
at least one of the pair of knob portions of the clamp main body has a shape bent outward in the peripheral direction of the ring portion so as to be separated from another of the pair of knob portions,
the holder includes
  a main body portion,
  a pair of holding walls that protrude from the main body portion and that face each other, the pair of holding walls clamping the pair of knob portions in a close state, and
  an operation portion that is connected to the main body portion and that is used for pulling the holder in the outer diameter direction of the ring portion,
an inner surface on a distal end side of one of the pair of holding walls includes a protrusion that protrudes more largely inward than an inner surface on a distal end side of another of the pair of holding walls, the protrusion being formed over less than an entire length of the one holding wall in an axial direction, and
in a state where the pair of knob portions are close to each other, a distal end of one knob portion in the peripheral direction is engaged with the inner surface of the one holding wall, and the other knob portion is engaged with the inner surface of the other holding wall, so that the ring portion is kept in a diameter-increased state.

2. The hose clamp according to claim 1, wherein
in a state where the ring portion is kept in the diameter-increased state, the one knob portion has a gap with the protrusion or an inner surface of the main body portion.

3. The hose clamp according to claim 1, wherein
in a state where the ring portion is kept in the diameter-increased state, the one knob portion has gaps with the protrusion and an inner surface of the main body portion.

4. The hose clamp according to claim 1, wherein
the inner surface of the other holding wall has a planar shape orthogonal to a direction in which the pair of holding walls face each other, or is formed to be inclined such that the distal end side of the other holding wall is away from the one holding wall.

5. The hose clamp according to claim 1, wherein
pressing walls are respectively arranged at positions in the holder that face outer side surfaces of the pair of knob portions in the axial direction.

6. The hose clamp according to claim 1, wherein
the distal end of the one knob portion in the peripheral direction is formed to be wider in the axial direction of the ring portion than the other knob portion.

7. A hose clamp comprising:
a clamp main body including
  a ring portion curved in a ring shape, and
  a pair of knob portions formed at both end portions of the ring portion in a peripheral direction so as to be bent in an outer diameter direction of the ring portion, the ring portion being decreased in a diameter in a state where the pair of knob portions are separated from each other and being increased in the diameter when the pair of knob portions are close to each other; and
a holder attached to the clamp main body, wherein at least one of the knob portions of the clamp main body has a shape bent outward in the peripheral direction of the ring portion so as to be separated from other knob portion, the holder includes
- a main body portion,
- a pair of holding walls that protrude from the main body portion and that face each other, the pair of holding walls clamping the pair of knob portions in a close state, and
- an operation portion that is connected to the main body portion and that is used for pulling the holder in the outer diameter direction of the ring portion, an inner surface on a distal end side of one holding wall includes a protrusion that protrudes more largely inward than an inner surface on a distal end side of the other holding wall, in a state where the pair of knob portions are close to each other, a distal end of one knob portion in the peripheral direction is engaged with the inner surface of the one holding wall, and the other knob portion is engaged with the inner surface of the other holding wall, so that the ring portion is kept in a diameter-increased state, and pressing walls are respectively arranged at positions in the holder that face outer side surfaces of the pair of knob portions in an axial direction.

\* \* \* \* \*